United States Patent
Yeh et al.

(10) Patent No.: US 12,107,728 B2
(45) Date of Patent: Oct. 1, 2024

(54) E2 NODE AND NEAR REAL-TIME RAN INTELLIGENT CONTROLLER (NEAR-RT RIC) CONFIGURED FOR PDCP DUPLICATION

(71) Applicant: Intel Corporation, Santa Clara, CA (US)

(72) Inventors: Shu-ping Yeh, Campbell, CA (US); Jaemin Han, Portland, OR (US); Wei Mao, San Jose, CA (US); Jingwen Bai, San Jose, CA (US); Murali Narasimha, Lake Oswego, OR (US)

(73) Assignee: Intel Corporation, Santa Clara, CA (US)

(*) Notice: Subject to any disclaimer, the term of this patent is extended or adjusted under 35 U.S.C. 154(b) by 189 days.

(21) Appl. No.: 17/404,309

(22) Filed: Aug. 17, 2021

(65) Prior Publication Data
US 2021/0377116 A1    Dec. 2, 2021

Related U.S. Application Data (60) Provisional application No. 63/066,777, filed on Aug. 17, 2020.

(51) Int. Cl.
*H04L 43/0829* (2022.01)
*H04L 1/00* (2006.01)
*H04L 41/0823* (2022.01)
*H04W 24/10* (2009.01)

(52) U.S. Cl.
CPC ........ *H04L 41/0836* (2013.01); *H04L 1/0003* (2013.01); *H04L 1/0009* (2013.01); *H04L 43/0829* (2013.01); *H04W 24/10* (2013.01)

(58) Field of Classification Search
CPC ..... H04L 1/0003; H04L 1/0009; H04L 24/10; H04L 43/0829
See application file for complete search history.

(56) References Cited

U.S. PATENT DOCUMENTS

| 2019/0098682 | A1* | 3/2019 | Park ...................... H04L 1/08 |
| 2020/0052826 | A1* | 2/2020 | Han ..................... H04W 76/15 |
| 2021/0377804 | A1* | 12/2021 | Sivaraj ................ H04W 76/15 |

OTHER PUBLICATIONS

"3GPP TS 38.401 v16.2.0", 5G; NG-RAN;Architecture description(3GPP TS 38.401 version 16.2.0 Release 16), (Jul. 2020), 79 pgs.
"O-RAN Alliance", [Online]. Retrieved from the Internet: URL: https: web.archive.org web 20210729062304 https:www.o-ran.org, (Jul. 29, 2021), 7 pgs.

(Continued)

*Primary Examiner* — Michael Thier
*Assistant Examiner* — Prince A Mensah
(74) *Attorney, Agent, or Firm* — Schwegman Lundberg & Woessner, P.A.

(57) ABSTRACT

Embodiments of a virtualized radio-access network (RAN) node configured to implement functions including an O-RAN Distributed Unit (DU), an O-RAN Radio Unit (RU), an O-RAN Central Unit-Control Plane (CU-CP), and an O-RAN Central Unit-User Plane (CU-UP), are described herein. In some embodiments, a reliability enhancement strategy is determined according to measurement reports collected from user equipment (UEs), the DU and the CU-UP.

17 Claims, 5 Drawing Sheets

(56) References Cited

OTHER PUBLICATIONS

"Telefrom Infra Project", [Online]. Retrieved from the Internet: URL: https: web.archive.org web 20210716182710 https: telecominfraproject.com , (Jul. 16, 2021), 10 pgs.

"3GPP TR 38.824 v16.0.0", 3rd Generation Partnership Project; Technical Specification Group Radio Access Network;Study on physical layer enhancements for NR ultra-reliable and low latency case (URLLC) (Release 16), (Mar. 2019), 14 pgs.

"3GPP TR 38.825 V16.0.0", 3rd Generation Partnership Project;Technical Specification Group Radio Access Network;Study on NR Industrial Internet of Things (IOT); (Release 16, (Mar. 2019), 33 pgs.

"Open Network Edge Services Software", [Online]. Retrieved from the Internet: URL: https: web.archive.org web 20210412121703 https: www.openness.org , (Apr. 12, 2021), 3 pgs.

"ETSI TS 138 300 V16.2.0", 5G;NR;NR and NG-RAN Overall description;Stage-2(3GPP TS 38.300 version 16.2.0 Release 16), (Jul. 2020), 150 pgs.

"3GPP TS 38.314 v16.0.0", 5G;NR;Layer 2 measurements(3GPP TS 38.314 version 16.0.0 Release 16), (Jul. 2020), 20 pgs.

"3GPP TS 28.552 v16.6.0", 5G;Management and orchestration;5G performance measurements(3GPP TS 28.552 version 16.6.0 Release 16), (Aug. 2020), 196 pgs.

"3GPP TS 38.214 v16.2.0", 5G;NR;Physical layer procedures for data(3GPP TS 38.214 version 16.2.0 Release 16), (Jul. 2020), 167 pgs.

"3GPP TS 36.401 v15.1.0", LTE;Evolved Universal TerrestrialRadio Access Network (E-UTRAN);Architecture description(3GPP TS 36.401 version 15.0.0 Release 15), (Sep. 2018), 23 pgs.

"3GPP TS 36.420 v15.2.0", LTE;Evolved Universal TerrestrialRadio Access Network (E-UTRAN);X2 general aspects and principles(3GPP TS 36.420 version 15.2.0 Release 15), (Jan. 2020), 16 pgs.

"3GPP TS 38.300 v16.0.0", 3rd Generation Partnership Project; Technical Specification Group Radio Access Network; NR; NR and NG-RAN Overall Description; Stage 2(Release 16), (Jun. 2021), 152 pgs.

"3GPP TS 38.401 v16.0.0", 3rd Generation Partnership Project; Technical Specification Group Radio Access Network NG-RAN;Architecture description(Release 16), (Jul. 2021), 79 pgs.

"3GPP TS 38.420 v15.2.0", 5G;NG-RAN;Xn general aspects and principles(3GPP TS 38.420 version 15.2.0 Release 15), (Apr. 2019), 16 pgs.

"3GPP TS 38.460 v16.0.0", 3rd Generation Partnership Project;Technical Specification Group Radio Access Network; NG-RAN;E1 general aspects and principles(Release 16), (Dec. 2019), 10 pgs.

"3GPP TS 38.470 v16.0.0", 3rd Generation Partnership Project;Technical Specification Group Radio Access Network; NG-RAN;F1 general aspects and principles(Release 16), (Dec. 2012), 13 pgs.

"O-RAN Architecture Description", O-RAN.WG1.O-RAN-Architecture-Description-v04.00, (2021), 33 pgs.

"O-RAN.WG3.E2AP-v02.00", O-RAN Working Group 3,Near-Real-time RAN Intelligent Controller,E2 Application Protocol (E2AP), (2021), 89 pgs.

"O-RAN.WG3.E2SM-KPM-v02.00", O-RAN Working Group 3Near-Real-time RAN Intelligent ControllerE2 Service Model (E2SM)KPM, (2020), 38 pgs.

"ORAN.WG3.E2SM-RC-v01.00", O-RAN Working Group 3Near-Real-time RAN Intelligent ControllerE2 Service Model (E2SM), Ran Control, (2020), 265 pgs.

"O-RAN.WG3.RICARCH-v02.00", O-RAN Working Group 3Near-Real-time RAN Intelligent ControllerNear-RT RIC Architecture, (2021), 59 pgs.

"O-RAN.WG3.UCR-v01.00", O-RAN Working Group 3Use Cases and Requirements, (2021), 32 pgs.

* cited by examiner

E2 NODE AND NEAR REAL-TIME RAN INTELLIGENT CONTROLLER (NEAR-RT RIC) CONFIGURED FOR PDCP DUPLICATION

PRIORITY CLAIM

This application claims priority under 35 U.S.C. 119(e) to U.S. Provisional Patent Application Ser. No. 63/066,777, filed Aug. 17, 2020 which is incorporated herein by reference in its entirety.

TECHNICAL FIELD

Embodiments pertain to wireless communications. Some embodiments pertain to fifth generation (5G) and sixth generation (6G) wireless communications. Some embodiments relate to Open Radio Access Networks (O-RANs).

BACKGROUND

Recently, there's been industrial and research activities on decoupling and virtualizing radio access network (RAN) functionalities to realize a disaggregated and cloud-native RAN. Such an architecture allows more flexible RAN topologies and moves RAN intelligence towards edge/cloud, enabling more innovative RAN management solutions. 3GPP already defined the centralized unit (CU) and distributed unit (DU) split architecture and the separation of CU-control-plane (CP) and CU-user-plane (UP) [1]. O-RAN [2] and Telecom Infra Project [3] are both industrial pioneers promoting open, disaggregated and virtualized RAN.

In order to enable RAN intelligence locating at cloud or edge to manage RAN nodes, new signaling needs to be defined to perform tasks that used to be proprietarily implemented within RAN infrastructure nodes, such as evolved NodeB (eNB) or 5G radio node (gNB). This disclosure proposes signaling for RAN intelligence at edge/cloud to configure RAN nodes for reliability enhancement. Reliable data transmission is an important quality of service (QoS) indicator for many emerging applications including factory automation and connected vehicles. Multiple reliability enhancement mechanisms are developed for 5G New Radio (NR) [4], [5].

There is no existing signaling defined for cloud/edge RAN intelligence to configure reliability enhancing mechanisms at RAN nodes. Currently, 3GPP only defines the signaling for negotiation between RAN nodes and between RAN and core network to establish reliability enhancements. Intelligence for configuring/triggering reliability enhancement is typically within RAN infrastructure nodes in today's network and no signaling is required. There is no existing solution to support a cloud/edge server to configure reliability enhancement for a disaggregated and cloud-native network. Without such capability, reliability enhancement would be internally configured by RAN nodes and the configuration may result in inefficient radio resource usage.

Thus what is needed is a signaling design for configuring radio access network reliability enhancement.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The present disclosure provides signaling mechanisms for configuring both 5G reliability enhancement schemes and futuristic reliability enhancing methods, such as network coding. The embodiments herein include signaling to instruct RAN nodes to perform reliability enhancement schemes including packet duplication, conservative rate selection and network coding. In addition, signaling for adjusting reliability control parameters and for measurement reports that are useful for reliability control are proposed.

Edge/cloud RAN intelligence can incorporate more information and perform more sophisticated optimization, such as machine learning. The embodiments herein enable edge/cloud compute server to provide RAN reliability enhancement service. The embodiments may be implemented as part of MEC SDK and/or open-source reference code (see e.g. [6]). Other edge computing architectures can be used in other implementations. Additionally, the embodiments herein can be incorporated in future specification published by industrial alliances, standards bodies, and/or the like, for example, such as ORAN or the like.

Figure 1:
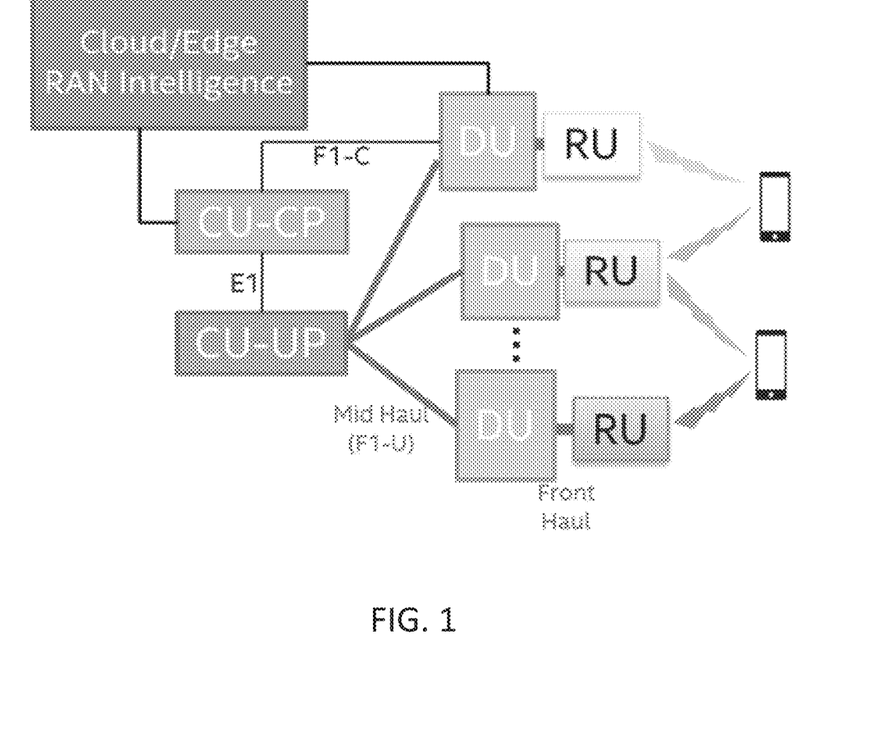
FIG. 1 illustrates a disaggregated virtualized radio access network (RAN), in accordance with some embodiments.

Embodiments herein include a disaggregated, virtualized RAN architecture as illustrated in FIG. 1, where traditional base station functions are decoupled into radio unit (RU), DU, CU-CP and CU-UP. Compute power at cloud or edge can be used to perform more sophisticated algorithms to realize advanced intelligent RAN management through providing guidance or direct control to RAN nodes. For example, a reliability enhancement algorithm deployed at cloud or edge server can incorporate past RAN performance history to determine a strategy to configure RAN nodes to assure data transmission reliability based on current RAN condition. In O-RAN, the entity to provide RAN management intelligence at cloud or edge server is called RAN Intelligent Controller (RIC). For simplicity, RIC will be used throughout the disclosure to represent cloud/edge server providing intelligent RAN management, but our proposals also apply to other cloud-native RAN architectures.

Though there are multiple reliability enhancing features specified for 5G NR, configuration of those features is typically done internally within eNB or gNB via proprietary implementation. For example, a radio bearer (RB) serving high reliability QoS flows can either be mapped to a RLC (Radio Link Control) channel linked to a logical channel providing ultra-low target block error rate (BLER) $\leq 10^{-5}$ or be mapped to 2-4 RLC channels linked to higher error rate (e.g., BLER $\leq 0.1$) logical channels with packet duplication activated.

Figure 2:
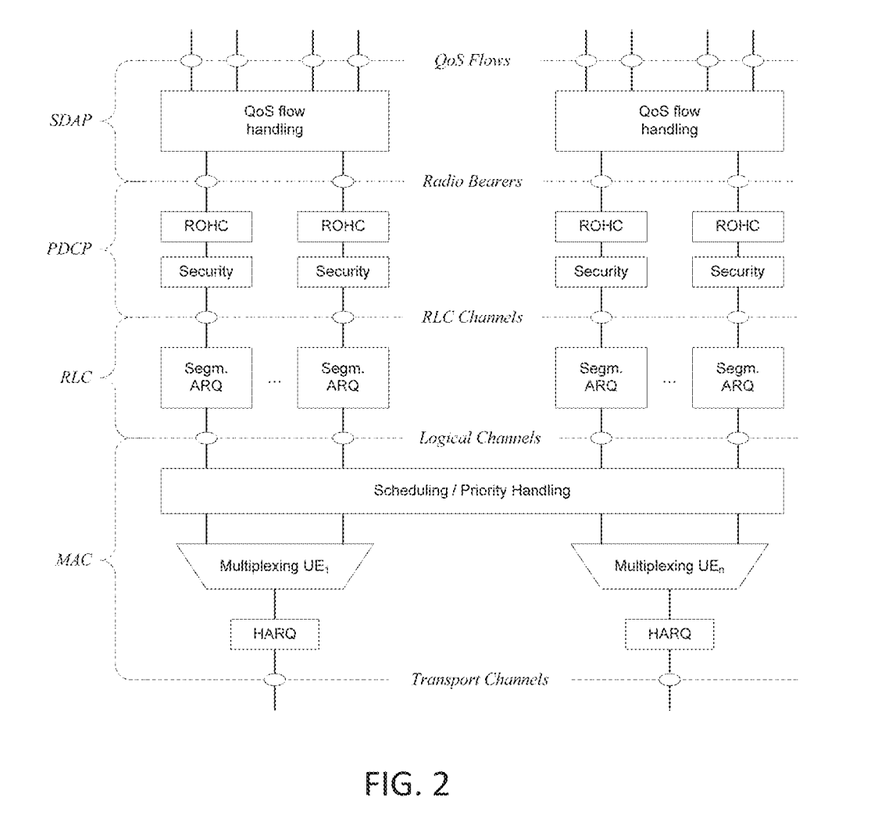
FIG. 2 illustrates a downlink layer 2 (L2) structure, in accordance with some embodiments.

FIG. 2 shows an example 5G RAN downlink (DL) layer 2 architecture [7]. Currently, the configuration for RB mapping is determined via clever RRC (Radio Resource Control) and PDCP (Packet Data Convergence Protocol) layer implementation and proprietary measurement reporting between PHY/MAC/RLC and PDCP/RRC layer. In a virtualized cloud-native RAN, cloud/edge RAN intelligence server should be able to control how an RB is mapped to logical channel(s). Currently, O-RAN work group 3 is actively discussing the signaling to enable such configurations. This disclosure proposes new signaling between cloud/edge RAN intelligence server and RAN nodes to improve reliability QoS. The proposed signaling can be used for O-RAN or other cloud-native RAN architectures.

To enable RIC to properly configure reliability enhancing mechanisms, it requires Measurement collection from RAN nodes, Algorithms at cloud/edge server to analyze which type of reliability enhancing mechanism should be configured based on past and current measurements from RAN nodes, and Control signaling from cloud/edge server to configure RAN nodes.

Measurement Collection from RAN Nodes

Two types for measurements are proposed to be reported from RAN nodes for configuring reliability enhancements: packet loss rate measured at PDCP or RLC layer and number of TB errors.

One key metric for reliability is packet loss rate which is defined as the ratio of packets that are lost due to lower layer transmission error, delay violation or buffer overflow. For example, [8] defines DL packet Uu Loss Rate per DRB (data RB) per UE (User Equipment) as $$M(T, drbid) = \left\lfloor \frac{Dloss(T, drbid) * 1000000}{N(T, drbid) + Dloss(T, drbid)} \right\rfloor,$$

where drbrid denotes the identity of the measured DRB, T denotes the time period during which the measurement is performed. During time period T, for packets belonging to DRB Identity=drbid, M(T,drbid) denotes packet loss rate in the DL, Dloss(T,drbid) denotes the number of lost DL packets (at least partially transmitted but not positively acknowledged) and N(T,drbid) denotes the number of successfully received DL packets (transmitted and positively acknowledged). A similar measurement is also defined for uplink (UL). [9] defines UL PDCP Service Data Unit (SDU) loss rate measurements with the option to split into subcounters per QoS level and subcounters per network slice.

PDCP layer packet loss measurements are useful for evaluating whether current configuration is sufficient to support the target packet loss rate for QoS flows mapped to the DRB being measured. However, when packet duplication or bearer splitting is configured, the above measurement mixes statistics from two or more separate logical channels that may have different error rate performance. Additional information regarding the error rate performance from individual logical channels can be useful for determining which type of reliability enhancement mechanism should be triggered. In various embodiments, the DL per logical channel packet loss rate can be measured at DU as follows:

$$M_l(T, lcid) = \left\lfloor \frac{Dloss(T, lcid) * 1000000}{N(T, lcid) + Dloss(T, lcid)} \right\rfloor,$$

where lcid denotes the identity of the measured logical channel, $M_l(T,lcid)$ is the packet loss rate per logical channel and all other elements follow similar definitions as the per DRB packet loss rate metric. Similarly, in various embodiments, a UE can measure UL per logical channel packet loss rate following the same formula and report the measurements to RAN nodes.

In some embodiments, packet loss rate per DRB per UE can be reported from CU to RIC and packet loss rate per logical channel per UE can be reported from DU to RIC. For example, the measurements can be sent over E2 to near-real-time RIC or over O1 to non-real-time RIC as defined in O-RAN.

Another important metric that's useful for assessing how well the MCS (Modulation and Coding Scheme) selection is done by DU is the TB (transport Block) error statistics. Measurement for the number of TB errors per DU is defined in [9]. For supporting ultra-reliable low latency communication (URLLC), a new Channel Quality Index (CQI) table is introduced for NR that can be used for target BLER $\leq 10^{-5}$. Since the TB error statistics are different for different target BLER, in some embodiments, the number of TB errors may be separately calculated when different CQI table is used for MAC scheduling. The TB error statistics should also be reported from DU to RIC.

Example Algorithms for Cloud/Edge Server to Configure Reliability Enhancing Mechanisms This section provides example implementations of how the measurements described in the previous section can be used to determine which reliability enhancement mechanism should be configured.

In some embodiments, the target QoS parameters for each QoS flow are available at RIC. According to the target QoS parameters, such as target packet loss rate, delay bound, minimum guaranteed bit rate, etc., RIC can run algorithms to determine which type of bearer configuration can support the target QoS based on RAN measurements. In addition, strategies described below can be used by RIC to configure reliability enhancement to fulfill service level agreements for a particular network slice.

Usage of PDCP Layer (Per DRB) Packet Loss Rate Measurement

PDCP layer error measurements provide a good indication of whether current bearer configuration can support the target packet loss rate. A simple trigger-based algorithm can be used for reliability enhancement configuration: If the packet loss rate of a DRB exceeds the target packet loss rate for QoS flow(s) mapped to the DRB, RIC can trigger reliability enhancement, such as configuring lower target error rate CQI mapping or packet duplication via dual-connectivity or carrier aggregation. If the packet loss rate of a DRB is below a certain threshold, RIC may deactivate a reliability enhancing scheme currently being used. More advanced algorithms that incorporate historic data can also be used to determine which reliability enhancement scheme should be prioritized based on the current network condition.

Usage of RLC Layer (Per Logical Channel) Packet Loss Rate Measurement

When packet duplication or bearer split is configured for a DRB, the per DRB packet loss rate can only reflect the aggregated transmission performance from all logical channels serving the DRB. Additional RLC layer packet loss rate measurements provide finer granularity on how reliable individual logical channels are. Based on per logical channel packet loss rate measurement, RIC can adjust RAN configuration, e.g., steering all traffic to one path only, adjust the MCS rate selection target error rate for one of the two paths, etc.

Network coding is one potential future RAN feature that can also be used to enhance reliability. If both the RAN node and UE are capable of network coding, RIC can configure network coding rate and packet distribution based on per logical channel packet loss rate measurement using some clever algorithms.

Usage of TB Error Measurement

The number of TB errors provides a good indication on how well the MCS rate selection is performed by MAC layer. During initial bearer setup, a more conservative configuration assuming worst case logical channel error rate can be used for reliability assurance. The worst-case error rate can be estimated based on the target TB error rate for the CQI-feedback/MCS-selection and maximum number of HARQ. The TB error statistics can be used as some confidence level indicator to decide whether to adjust worst-case error rate while configuring reliability enhancement. In addition, time traces of the number of TB errors can be used for anomaly detection to identify potential network configuration problems. When determining resource reservation/isolation strategies for a network slice with high reliability requirements, TB error statistics can be also be useful for identifying which cell should be reserved for high reliability slice.

Control Signaling from Cloud/Edge Server to Configure RAN Nodes

In this section, signaling from RIC to control RAN node configuration for reliability enhancement is proposed, including configuration for packet duplication, configuration to enforce certain target error rate for logical channels and configuration to enable network coding. There can be two types of control signaling: 1) direct configuration of reliability enhancement mechanisms, and 2) a policy defining triggering criteria and the subsequent reliability enhancement mechanisms. Configuration parameters that can be part of the direct configuration control signaling or be part of the policy description for policy-based control are discussed infra.

Configuration of Packet Duplication

For a UE configured with carrier aggregation (CA) or dual connectivity (DC), RAN can trigger packet duplication to improve reliability. In embodiments, CA and/or DC are already properly configured for the UE by RAN nodes. RIC may also configure CA and/or DC for a UE, e.g., the O-RAN traffic steering use case discusses possible signaling for DC and CA configuration [2].

To configure packet duplication, RIC should specify the following:

The RB ID for the radio bearer to be configured with packet duplication

The number of logical channels to be configured for packet duplication. For example, the number can be 2-4 according to current 3GPP spec.

The candidate cell IDs for the logical channels to be configured for the RB for packet duplication.

A CU-CP supporting cloud/edge-configured reliability enhancement should perform follow-up actions to finish packet duplication configuration, including configuring RLC entities for packet duplication, sending signaling over X2, Xn or F1 to modify secondary-node or UE context information, etc.

In addition, the CU-CP can provide response message containing the logical channel ID configured for packet duplication for the RB to RIC.

Adjust Target BLER for TBs for Logical Channels

In order to ensure QoS flow packet loss rate target is met, PHY/MAC configurations should be properly adjusted for supporting the logical channel(s) serving the QoS flow. Currently, QoS parameters and information about whether packet duplication is activated are available at DU. In CU-DU split architecture, PHY/MAC configuration are done at DU and it's not clear how PHY/MAC configurations are adjusted based on QoS target packet loss rate when packet duplication is activated. In embodiments, the RIC can provide direct influence on the target packet loss rate for individual logical channel when packet duplication is configured. RIC can specify the following to a DU:

The logical channel ID

The target packet loss rate for the logical channel.

A DU supporting cloudledge-configured reliability enhancement should perform follow-up actions to configure PHY/MAC to ensure the target packet loss rate for the logical channel can be satisfied.

Alternatively, RIC can indicate the target BLER for TBs used to support the logical channels. For example, RIC can indicate that CQI-table3 defined in [1] should be used for CQI feedback and rate selection for scheduling the logical channel so that BLER $\leq 10^{-5}$ is enforced.

In addition, RIC can mandate certain QoS flows to always be transmitted at certain MCS level to ensure, e.g., 99.9999999% service availability.

Configure Network Coding

Network coding is a potential new reliability enhancement feature in future 3GPP releases. RIC can calculate the coding rate and packet distribution strategy based on RAN measurements and configure RAN nodes accordingly. Network coding can be applied between PDCP and RLC layer for UE configured with CA and/or DC. Configuration signaling from RIC to CU-CP can include:

The RB ID for the radio bearer to be configured with network coding

The number of logical channels to be configured for network coding. For example, current 3GPP spec only support the number to be 2 (if NC is applied for a split bearer) or 2-4 (if NC is applied as an alternative to packet duplication).

The candidate cell IDs for the logical channels to be configured for the RB with network coding.

The codebook and coding rate for network coding.

The packet distribution rule: which set of network coded packets goes to which logical channel.

The target packet loss rate for the logical channel(s) to serve the RB with network coding.

A CU-CP supporting cloud/edge-configured reliability enhancement should perform follow-up actions to finish network coding configuration, including configuring RRC signaling with UE to indicate codebook and code rate used for network coding, configuring RLC entities for bearer splitting, sending signaling over X2, Xn or F1 to modify secondary-node or UE context information, etc.

Configure Resource Reservation and Logical Channel Prioritization Rules

When jointly considering delay and reliability QoS targets, specific traffic prioritization or resource reservation rules need to be configured in order to reliably deliver the QoS flow within certain latency bound. RAN supporting network slicing can also allocate dedicated RAN resources for high reliability slice. Signaling from RIC to CU-CP to configurate resource reservation and logical channel prioritization can include:

The slice ID for high reliability slice and/or RB ID for reliability bearer.

The cell ID of the cell(s) to be configured to prioritize the transmission for the slice/bearers.

The amount of data volume to be configured with high priority resource reservation.

Figure 3:
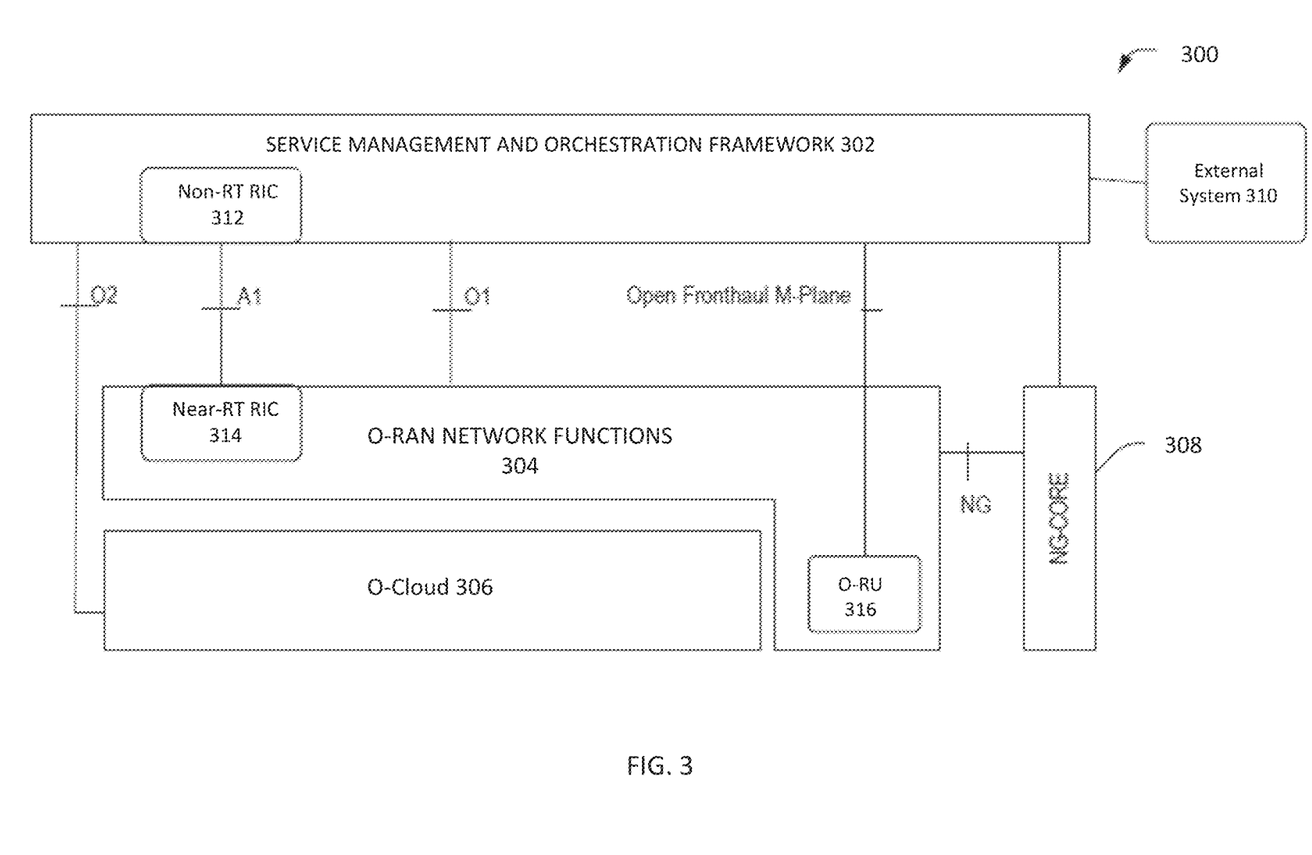
FIG. 3 illustrates an example Open RAN (O-RAN) system architecture.

FIG. 3 provides a high-level view of an Open RAN (O-RAN) architecture 300. The O-RAN architecture 300 includes four O-RAN defined interfaces-namely, the A1 interface, the O1 interface, the O2 interface, and the Open Fronthaul Management (M)-plane interface-which connect the Service Management and Orchestration (SMO) framework 302 to O-RAN network functions (NFs) 304 and the O-Cloud 306. The SMO 302 framework (described in [13]) also connects with an external system 310, which provides enrichment data to the SMO 302 framework. FIG. 3 also illustrates that the A1 interface terminates at an O-RAN Non-Real Time (RT) RAN Intelligent Controller (RIC) 312 in or at the SMO 302 framework and at the O-RAN Near-RT RIC 314 in or at the O-RAN NFs 304. The O-RAN NFs 304 can be VNFs such as VMs or containers, sitting above the O-Cloud 306 and/or Physical Network Functions (PNFs) utilizing customized hardware. All O-RAN NFs 304 are expected to support the O1 interface when interfacing the SMO framework 302. The O-RAN NFs 304 connect to the NG-Core 308 via the NG interface (which is a 3GPP defined interface). The Open Fronthaul M-plane interface between the SMO framework 302 and the O-RAN Radio Unit (O-RU) 316 supports the O-RU 316 management in the O-RAN hybrid model as specified in [16]. The Open Fronthaul M-plane interface is an optional interface to the SMO framework 302 that is included for backward compatibility purposes as per [16] and is intended for management of the O-RU 316 in hybrid mode only. The management architecture of flat mode [12] and its relation to the O1 interface for the O-RU 316 is for future study. The O-RU 316 termination of the O1 interface towards the SMO framework 302 as specified in [12].

Figure 4:
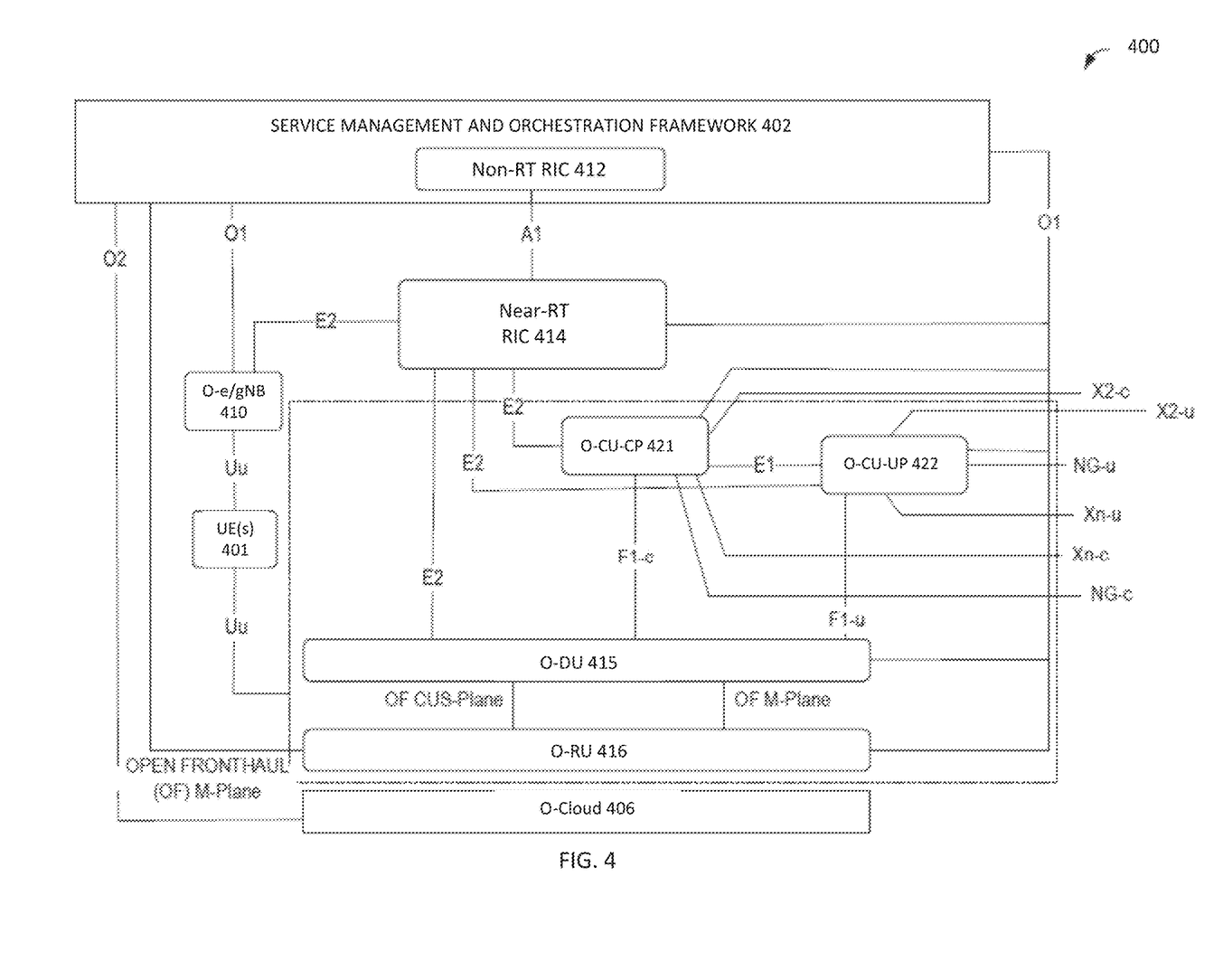
FIG. 4 illustrates a logical architecture of the O-RAN system of FIG. 3.

FIG. 4 shows an O-RAN logical architecture 400 corresponding to the O-RAN architecture 300 of FIG. 3. In FIG. 4, the SMO framework 402 corresponds to the SMO framework 302, O-Cloud 406 corresponds to the O-Cloud 306, the non-RT RIC 412 corresponds to the non-RT RIC 312, the near-RT RIC 414 corresponds to the near-RT RIC 314, and the O-RU 416 corresponds to the O-RU 316 of FIG. 4, respectively. The O-RAN logical architecture 400 includes a radio portion and a management portion.

The management portion/side of the architectures 400 includes the SMO Framework 402 containing the non-RT RIC 412, and may include the O-Cloud 406. The O-Cloud 406 is a cloud computing platform including a collection of physical infrastructure nodes to host the relevant O-RAN functions (e.g., the near-RT RIC 414, O-CU-CP 421, O-CU-UP 422, and the O-DU 415), supporting software components (e.g., OSs, VMMs, container runtime engines, ML engines, etc.), and appropriate management and orchestration functions.

The radio portion/side of the logical architecture 400 includes the near-RT RIC 414, the O-RAN Distributed Unit (O-DU) 415, the O-RU 416, the O-RAN Central Unit-Control Plane (O-CU-CP) 421, and the O-RAN Central Unit-User Plane (O-CU-UP) 422 functions. The radio portion/side of the logical architecture 400 may also include the O-e/gNB 410.

The O-DU 415 is a logical node hosting RLC, MAC, and higher PHY layer entities/elements (High-PHY layers) based on a lower layer functional split. The O-RU 416 is a logical node hosting lower PHY layer entities/elements (Low-PHY layer) (e.g., FFT/iFFT, PRACH extraction, etc.) and RF processing elements based on a lower layer functional split. Virtualization of O-RU 416 is FFS. The O-CU-CP 421 is a logical node hosting the RRC and the control plane (CP) part of the PDCP protocol. The O O-CU-UP 422 is a logical node hosting the user plane part of the PDCP protocol and the SDAP protocol.

An E2 interface terminates at a plurality of E2 nodes. The E2 nodes are logical nodes/entities that terminate the E2 interface. For NR/5G access, the E2 nodes include the O-CU-CP 421, O-CU-UP 422, O-DU 415, or any combination of elements as defined in [15]. For E-UTRA access the E2 nodes include the O-e/gNB 410. As shown in FIG. 4, the E2 interface also connects the O-e/gNB 410 to the Near-RT RIC 414. The protocols over E2 interface are based exclusively on Control Plane (CP) protocols. The E2 functions are grouped into the following categories: (a) near-RT RIC 414 services (REPORT, INSERT, CONTROL and POLICY, as described in [15]); and (b) near-RT RIC 414 support functions, which include E2 Interface Management (E2 Setup, E2 Reset, Reporting of General Error Situations, etc.) and Near-RT RIC Service Update (e.g., capability exchange related to the list of E2 Node functions exposed over E2).

FIG. 4 shows the Uu interface between a UE 401 and O-e/gNG 410 as well as between the UE 401 and O-RAN components. The Uu interface is a 3GPP defined interface (see e.g., sections 5.2 and 5.3 of [07]), which includes a complete protocol stack from L1 to L3 and terminates in the NG-RAN or E-UTRAN. The O-e/gNB 410 is an LTE eNB [04], a 5G gNB or ng-eNB [06] that supports the E2 interface. There may be multiple UEs 401 and/or multiple O-e/gNB 410, each of which may be connected to one another the via respective Uu interfaces. Although not shown in FIG. 4, the O-e/gNB 410 supports O-DU 415 and O-RU 416 functions with an Open Fronthaul interface between them.

The Open Fronthaul (OF) interface(s) is/are between O-DU 415 and O-RU 416 functions [16] [17]. The OF interface(s) includes the Control User Synchronization (CUS) Plane and Management (M) Plane. FIGS. 3 and 4 also show that the O-RU 416 terminates the OF M-Plane interface towards the O-DU 415 and optionally towards the SMO framework 402 as specified in [16]. The O-RU 416 terminates the OF CUS-Plane interface towards the O-DU 415 and the SMO framework 402.

The F1-c interface connects the O-CU-CP 421 with the O-DU 415. As defined by 3GPP, the F1-c interface is between the gNB-CU-CP and gNB-DU nodes [07] [10]. However, for purposes of O-RAN, the F1-c interface is adopted between the O-CU-CP 421 with the O-DU 415 functions while reusing the principles and protocol stack defined by 3GPP and the definition of interoperability profile specifications.

The F1-u interface connects the O-CU-UP 22 with the O-DU 415. As defined by 3GPP, the F1-u interface is between the gNB-CU-UP and gNB-DU nodes [07] [10]. However, for purposes of O-RAN, the F1-u interface is adopted between the O-CU-UP 422 with the O-DU 415 functions while reusing the principles and protocol stack defined by 3GPP and the definition of interoperability profile specifications.

The NG-c interface is defined by 3GPP as an interface between the gNB-CU-CP and the AMF in the 5GC [06]. The NG-c is also referred as the N2 interface (see [06]). The NG-u interface is defined by 3GPP, as an interface between the gNB-CU-UP and the UPF in the 5GC [06]. The NG-u interface is referred as the N3 interface (see [06]). In O-RAN, NG-c and NG-u protocol stacks defined by 3GPP are reused and may be adapted for O-RAN purposes.

The X2-c interface is defined in 3GPP for transmitting control plane information between eNBs or between eNB and en-gNB in EN-DC. The X2-u interface is defined in 3GPP for transmitting user plane information between eNBs or between eNB and en-gNB in EN-DC (see e.g., [05], [06]). In O-RAN, X2-c and X2-u protocol stacks defined by 3GPP are reused and may be adapted for O-RAN purposes The Xn-c interface is defined in 3GPP for transmitting control plane information between gNBs, ng-eNBs, or between an ng-eNB and gNB. The Xn-u interface is defined in 3GPP for transmitting user plane information between gNBs, ng-eNBs, or between ng-eNB and gNB (see e.g., [06], [08]). In O-RAN, Xn-c and Xn-u protocol stacks defined by 3GPP are reused and may be adapted for O-RAN purposes The E1 interface is defined by 3GPP as being an interface between the gNB-CU-CP (e.g., gNB-CU-CP 3728) and gNB-CU-UP (see e.g., [07], [09]). In O-RAN, E1 protocol stacks defined by 3GPP are reused and adapted as being an interface between the O-CU-CP 421 and the O-CU-UP 422 functions.

The O-RAN Non-Real Time (RT) RA Intelligent Controller (RIC) 412 is a logical function within the SMO framework 302, 402 that enables non-real-time control and optimization of RAN elements and resources; AI/machine learning (ML) workflow(s) including model training, inferences, and updates; and policy-based guidance of applications/features in the Near-RT RIC 414.

The O-RAN near-RT RIC 414 is a logical function that enables near-real-time control and optimization of RAN elements and resources via fine-grained, data collection and actions over the E2 interface. The near-RT RIC 414 may include one or more AI/ML workflows including model training, inferences, and updates.

The non-RT RIC 412 can be an ML training host to host the training of one or more ML models. ML training can be performed offline using data collected from the RIC, O-DU 415 and O-RU 416. For supervised learning, non-RT RIC 412 is part of the SMO framework 402, and the ML training host and/or ML model host/actor can be part of the non-RT RIC 412 and/or the near-RT RIC 414. For unsupervised learning, the ML training host and ML model host/actor can be part of the non-RT RIC 412 and/or the near-RT RIC 414. For reinforcement learning, the ML training host and ML model host/actor may be co-located as part of the non-RT RIC 412 and/or the near-RT RIC 414. In some implementations, the non-RT RIC 412 may request or trigger ML model training in the training hosts regardless of where the model is deployed and executed. ML models may be trained and not currently deployed.

In some implementations, the non-RT RIC 412 provides a query-able catalog for an ML designer/developer to publish/install trained ML models (e.g., executable software components). In these implementations, the non-RT RIC 412 may provide discovery mechanism if a particular ML model can be executed in a target ML inference host (MF), and what number and type of ML models can be executed in the MF. For example, there may be three types of ML catalogs made discoverable by the non-RT RIC 412: a design-time catalog (e.g., residing outside the non-RT RIC 412 and hosted by some other ML platform(s)), a training/deployment-time catalog (e.g., residing inside the non-RT RIC 412), and a run-time catalog (e.g., residing inside the non-RT RIC 412). The non-RT RIC 412 supports necessary capabilities for ML model inference in support of ML assisted solutions running in the non-RT RIC 412 or some other ML inference host. These capabilities enable executable software to be installed such as VMs, containers, etc. The non-RT RIC 412 may also include and/or operate one or more ML engines, which are packaged software executable libraries that provide methods, routines, data types, etc., used to run ML models. The non-RT MC 412 may also implement policies to switch and activate ML model instances under different operating conditions.

The non-RT RIC 42 is be able to access feedback data (e.g., FM and PM statistics) over the O1 interface on ML model performance and perform necessary evaluations. If the ML model fails during runtime, an alarm can be generated as feedback to the non-RT RIC 412. How well the ML model is performing in terms of prediction accuracy or other operating statistics it produces can also be sent to the non-RT RIC 412 over O1. The non-RT RIC 412 can also scale ML model instances running in a target ME over the O1 interface by observing resource utilization in MF. The environment where the ML model instance is running (e.g., the MF) monitors resource utilization of the running ML model. This can be done, for example, using an ORAN-SC component called ResourceMonitor in the near-RT RIC 414 and/or in the non-RT MC 412, which continuously monitors resource utilization. If resources are low or fall below a certain threshold, the runtime environment in the near-RT RIC 414 and/or the non-RT RIC 412 provides a scaling mechanism to add more ML instances. The scaling mechanism may include a scaling factor such as an number, percentage, and/or other like data used to scale up/down the number of ML instances. ML model instances running in the target ML inference hosts may be automatically scaled by observing resource utilization in the MF. For example, the Kubernetes® (K8s) runtime environment typically provides an auto-scaling feature.

The A1 interface is between the non-RT RIC 412 (within or outside the SMO framework 402) and the near-RT RIC 414. The A1 interface supports three types of services as defined in [14], including a Policy Management Service, an Enrichment Information Service, and ML Model Management Service. A1 policies have the following characteristics compared to persistent configuration [14]: A1 policies are not critical to traffic; A1 policies have temporary validity; A1 policies may handle individual UE or dynamically defined groups of UEs; A1 policies act within and take precedence over the configuration; and A1 policies are non-persistent, i.e., do not survive a restart of the near-RT RIC.

Figure 5:
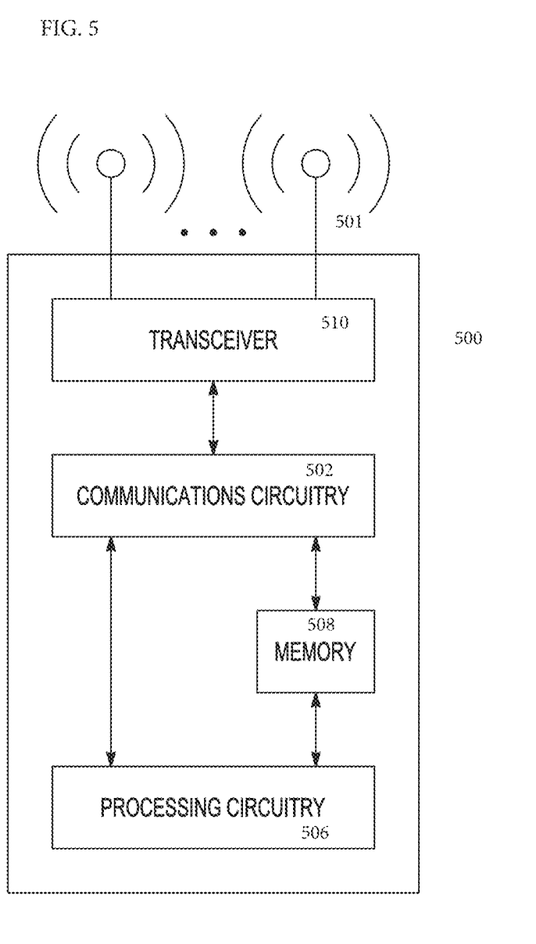
FIG. 5. illustrates a functional block diagram of a wireless communication device in accordance with some embodiments.

FIG. 5 illustrates a functional block diagram of a wireless communication device, in accordance with some embodiments. Wireless communication device 500 may be suitable for use as a UE or gNB configured for operation in a 5G NR network or O-RAN as discussed above. The communication device 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber device, an access point, an access terminal, or other personal communication system (PCS) device.

The communication device 500 may include communications circuitry 502 and a transceiver 510 for transmitting and receiving signals to and from other communication devices using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication device 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication device 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash memory devices and other storage devices and media.

In some embodiments, the communication device 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 500 may include one or more of a keyboard, a display, a non-volatile memory port, multiple antennas, a graphics processor, an application processor, speakers, and other mobile device elements. The display may be an LCD screen including a touch screen.

Although the communication device 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 500 may refer to one or more processes operating on one or more processing elements.

REFERENCES

[1] 3GPP TS 38.401 v16.2.0 (2020 Jul. 17).
[2] O-RAN Alliance https://www.o-ran/org/
[3] Telecom Infra Project https://telecominfraproject.com/
[4] 3GPP TR 38.824 v16.0.0 (2019 Mar. 27).
[5] 3GPP TR 38.825 v16.0.0 (2019 Apr. 14).
[6] Open Network Edge Services Software (OpenNESS), see: https://www.openness.org/
[7] 3GPP TS 38.300 v16.2.0 (2020 Jul. 24).
[8] 3GPP TS 38.314 v16.0.0 (2020 Jul. 24).
[9] 3GPP TS 28.552 v16.6.0 (2020 Jul. 10).
[11] 3GPP TS 38.214 v16.2.0 (2020 Jul. 20).
[04] 3GPP TR 36.401 v15.1.0 (2019 Jan. 9).
[05] 3GPP IS 36.420 v15.2.0 (2020 Jan. 9).
[06] 3GPP IS 38.300 v16.0.0 (2020 Jan. 8).
[07] 3GPP TS 38.401 v16.0.0 (2020 Jan. 9).
[08] 3GPP IS 38.420 v15.2.0 (2019 Jan. 8).
[09] 3GPP TS 38.460 v16.0.0 (2020 Jan. 9).
[10] 3GPP TS 38.470 v16.0.0 (2020 Jan. 9).
[12] O-RAN Alliance Working Group 1, O-RAN Operations and Maintenance Architecture Specification, version 2.0 (December 2019) ("O-RAN-WG1.OAM-Architecture-v02.00").
[13] O-RAN Alliance Working Group 1, O-RAN Operations and Maintenance Interface Specification, version 2.0 (December 2019) ("O-RAN-WG1.O1-Interface-v02.00").
[14] O-RAN Alliance Working Group 2, O-RAN A1 interface: General Aspects and Principles Specification, version 1.0 (October 2019) ("ORAN-WG2.A1.GA&P-v01.00").
[15] O-RAN Alliance Working Group 3, Near-Real-time RAN Intelligent Controller Architecture & E2 General Aspects and Principles ("ORAN-WG3.E2GAP.0-v0.1").
[16] O-RAN Alliance Working Group 4, O-RAN Fronthaul Management Plane Specification, version 2.0 (July 2019) ("ORAN-WG4.MP.0-v02.00.00").

[17] O-RAN Alliance Working Group 4, O-RAN Fronthaul Control, User and Synchronization Plane Specification, version 2.0 (July 2019) ("ORAN-WG4-CUS.0-v02.00").

EXAMPLES

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Additional examples of the presently described embodiments include the following, non-limiting implementations. Each of the following non-limiting examples may stand on its own or may be combined in any permutation or combination with any one or more of the other examples provided below or throughout the present disclosure.

Example 1 includes a system comprising: a compute server, an NG-RAN, and a UE, the NG-RAN comprising: DU, CU-CP, CU-UP and/or other elements as described in 3GPP TS 38.300.

Example 2 includes the system of example 1 and/or some other example(s) herein, wherein the compute server determines reliability enhancement strategy according to measurement reports collected from UE, DU and CU-UP.

Example 3 includes the system of example 2 and/or some other example(s) herein, wherein CU-UP supports measurement of per radio bearer packet loss rate and sends measurement report containing per radio bearer packet loss rate to the compute server.

Example 4 includes the system of example 2 and/or some other example(s) herein, wherein DU supports measurement of downlink per logical channel packet loss rate and sends measurement report containing downlink per logical channel packet loss rate to the compute server.

Example 5 includes the system of example 2 and/or some other example(s) herein, wherein UE supports measurement of uplink per logical channel packet loss rate and sends measurement report containing uplink per logical channel packet loss rate to the compute server.

Example 6 includes the system of example 2 and/or some other example(s) herein, wherein DU supports measurement of the number of transport block errors and sends measurement report containing the number of transport block errors to the compute server.

Example 7 includes the system of example 6 and/or some other example(s) herein, wherein separate sub-counters are used to measure and report the number of transport block errors for transport blocks configured with different target block error rates.

Example 8 includes the system of example 2 and/or some other example(s) herein, wherein the reliability enhancement strategy is to activate or deactivate packet duplication based on metrics within the measurement report.

Example 9 includes the system of example 2 and 8 and/or some other example(s) herein, wherein the compute server determines to activate packet duplication if one or more metric within the measurement report exceeds one threshold and determines to deactivate packet duplication if one or more metric within the measurement report falls below another threshold.

Example 10 includes the system of example 8 and/or some other example(s) herein, wherein the compute server sends to CU-CP and CU-UP configuration messages to activate or deactivate packet duplication and the messages contain the identification of bearer for packet duplication.

Example 11 includes the system of example 10 and/or some other example(s) herein, wherein the configuration message specifies the number of logical channels to be configured for packet duplication.

Example 12 includes the system of example 10 and/or some other example(s) herein, wherein the configuration message specifies the candidate cell IDs for the logical channels to be configured for the RB for packet duplication.

Example 13 includes the system of example 10 and/or some other example(s) herein, wherein CU-CP sends a response message to the compute server indicating the identification of the logical channels configured for packet duplication.

Example 14 includes the system of example 2 and/or some other example(s) herein, wherein the compute server calculates target packet loss rate for a logical channel and sends to DU a configuration message that contains the logical channel ID and the target packet loss rate for the logical channel.

Example 15 includes the system of example 2 and/or some other example(s) herein, wherein the compute server calculates target transport block error rate for a logical channel and sends to DU a configuration message that contains the logical channel ID and the target transport block error rate for the logical channel.

Example 16 includes the system of example 2 and/or some other example(s) herein, wherein the compute server determines the target transport block error rate to be used for modulation and coding scheme (MCS) selection and sends to CU and DU a configuration message that contains the logical channel ID and channel quality index (CQI) table to be used for CQI feedback and MCS selection for the logical channel.

Example 17 includes the system of example 2 and/or some other example(s) herein, wherein the compute server determines the modulation and coding scheme (MCS) to be used for servicing a logical channel and sends to DU a configuration message containing the logical channel ID and the MCS level to be selected.

Example 18 includes the system of example 2 and/or some other examples) herein, wherein the reliability enhancement strategy is to activate or deactivate network coding based on metrics within the measurement reports.

Example 19 includes the system of example 18 and/or some other example(s) herein, wherein the compute server sends to CU-CP and CU-UP configuration messages to activate or deactivate network coding for a split bearer and the messages contain the identification of the split bearer for network coding.

Example 20 includes the system of example 19 and/or some other example(s) herein, wherein the configuration message further includes the number of logical channels to be configured for split bearer and the candidate cell IDs for the logical channels to be configured for split bearer with network coding.

Example 21 includes the system of example 19 and/or some other example(s) herein, wherein the configuration message further contains network coding parameters, including codebook or codebook index for network coding, network coding rate.

Example 22 may include example 19 and/or some other example(s) herein, wherein the configuration message further includes packet distribution rule that indicates which set of network coded packets should be sent over which logical channel.

Example 23 includes the system of example 19 and/or some other example(s) herein, wherein, after receiving configuration message from the compute server, the CU-CP configures and sends a RRC message to UE indicating network coding configurations.

Example 24 includes the system of example 2 and/or some other example(s) herein, wherein the reliability enhancement strategy is to reserve dedicated resource for transmission based on metrics within the measurement report.

Example 5 includes the system of example 24 and/or some other example(s) herein, wherein computer server sends to CU-CP configuration messages to reserve dedicated resource for transmission and the messages contain the identification of the network slice and bearer requiring resource reservation, the identification of the cell to provide resource reservation, the data volume to the cell should reserve resource to support, and the priority level for the network slice and bearer.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an E2 node configured for operation in a radio-access network (RAN), the apparatus comprising: processing circuitry; and memory,
   the E2 node configured for communicating with a near real-time RAN intelligent controller (Near-RT RIC) over an E2 interface,
   wherein the processing circuitry is to configure the E2 node to:
   decode a control message received from the Near-RT RIC, the control message to configure the E2 node to invoke procedures related to Packet Data Convergence Protocol (PDCP) Duplication Control for a Data Radio Bearer (DRB), the control message including a DRB identity (ID);
   encode signalling for transmission to one or more user equipment (UEs) to configure the UEs for one or more measurements, including Packet Loss Rate, for reporting to the E2 node;
   report measurements, including Packet Loss Rate per DRB per UE and per logical channel, to the Near-RT RIC over the E2 interface;
   encode an action request message for transmission to the Near-RT RIC, the action request message to request activation or deactivation of PDCP duplication for the DRB; and
   decode a response message received from the Near-RT RIC in response to the action request message, the response message indicating whether the Near-RT RIC accepts or rejects the request for activation or deactivation of PDCP duplication for the DRB,
   wherein the request for activation or deactivation of PDCP duplication for the DRB is based on one or more RAN parameters for policy, and
   wherein the E2 node is configured to report the Packet Loss Rate and request the PDCP duplication for reliability enhancement to achieve quality-of-service (QoS) targets.

2. The apparatus of claim 1, wherein the E2 node is further configured to report UE-level, cell level and network slice level measurements to the Near-RT RIC.

3. The apparatus of claim 2, wherein the E2 node is a logical node that terminates the E2 interface, the E2 node comprising logical nodes including an O-RAN Distributed Unit (O-DU), an O-RAN Radio Unit (O-RU) an O-RAN Central Unit-Control Plane (O-CU-CP), and an O-RAN Central Unit-User Plane (O-CU-UP).

4. The apparatus of claim 3, wherein the packet loss rate at the cell level is reported from at the O-CU-UP or the O-DU.

5. The apparatus of claim 4, wherein when the action request message is a request for activation of PDCP duplication, the processing circuitry is configured to:
   perform PDCP duplication when the Near-RT RIC accepted the request for activation; and
   refrain from performing PDCP duplication when the Near-RT RIC rejected the request for activation.

6. The apparatus of claim 5, wherein when the action request message is a request for deactivation of PDCP duplication, the processing circuitry is configured to:
   continue to perform PDCP duplication when the Near-RT RIC rejected the request for deactivation; and
   refrain from continuing to perform PDCP duplication when the Near-RT RIC rejected the request for deactivation.

7. The apparatus of claim 6, wherein in response to configuring the UEs to report Packet Loss Rate, the processing circuitry is configured to decode reports received from the UEs that report the Packet Loss Rate.

8. The apparatus of claim 4, wherein the processing circuitry is configured to:
   determine a reliability enhancement strategy to achieve the QoS targets; and
   collect measurement reports collected the UEs, the O-DU and the O-CU-UP.

9. The apparatus of claim 4, wherein the O-RU comprises baseband processing circuitry, and/;
   wherein the memory is configured to store the control message.

10. A non-transitory computer-readable storage medium that stores instructions for execution by processing circuitry of an E2 node configured for operation in a radio-access network (RAN), the E2 node configured for communicating with a near real-time RAN intelligent controller (Near-RT RIC) over an E2 interface,
    wherein the processing circuitry is to configure the E2 node to:
    decode a control message received from the Near-RT RIC, the control message to configure the E2 node to invoke procedures related to Packet Data Convergence Protocol (PDCP) Duplication Control for a Data Radio Bearer (DRB), the control message including a DRB identity (ID);
    encode signalling for transmission to one or more user equipment (UEs) to configure the UEs for one or more measurements, including Packet Loss Rate, for reporting to the E2 node;

report measurements, including Packet Loss Rate per DRB per UE and per logical channel, to the Near-RT RIC over the E2 interface;

encode an action request message for transmission to the Near-RT RIC, the action request message to request activation or deactivation of PDCP duplication for the DRB; and decode a response message received from the Near-RT RIC in response to the action request message, the response message indicating whether the Near-RT RIC accepts or rejects the request for activation or deactivation of PDCP duplication for the DRB, wherein the request for activation or deactivation of PDCP duplication for the DRB is based on one or more RAN parameters for policy, and wherein the E2 node is configured to report the Packet Loss Rate and request the PDCP duplication for reliability enhancement to achieve quality-of-service (QoS) targets.

11. The non-transitory computer-readable storage medium of claim 10, wherein the E2 node is further configured to report UE-level, cell level and network slice level measurements to the Near-RT RIC.

12. The non-transitory computer-readable storage medium of claim 11, wherein the E2 node is a logical node that terminates the E2 interface, the E2 node comprising logical nodes including an O-RAN Distributed Unit (O-DU), an O-RAN Radio Unit (O-RU) an O-RAN Central Unit-Control Plane (O-CU-CP), and an O-RAN Central Unit-User Plane (O-CU-UP).

13. The non-transitory computer-readable storage medium of claim 12, wherein the packet loss rate at the cell level is reported from at the O-CU-UP or the O-DU.

14. The non-transitory computer-readable storage medium of claim 13, wherein when the action request message is a request for activation of PDCP duplication, the processing circuitry is configured to:

perform PDCP duplication when the Near-RT RIC accepted the request for activation; and refrain from performing PDCP duplication when the Near-RT RIC rejected the request for activation.

15. The non-transitory computer-readable storage medium of claim 14, wherein when the action request message is a request for deactivation of PDCP duplication, the processing circuitry is configured to:

continue to perform PDCP duplication when the Near-RT RIC rejected the request for deactivation; and refrain from continuing to perform PDCP duplication when the Near-RT RIC rejected the request for deactivation.

16. The non-transitory computer-readable storage medium of claim 15, wherein in response to configuring the UEs to report Packet Loss Rate, the processing circuitry is configured to decode reports received from the UEs that report the Packet Loss Rate.

17. An apparatus for a near real-time RAN intelligent controller (Near-RT RIC), the apparatus comprising: processing circuitry; and memory, the Near-RT RIC configured to communicate with an E2 node configured for operation in a radio-access network (RAN) over an E2 interface, wherein the processing circuitry is to configure the Near-RT RIC node to:

encode a control message for transmission over the E2 interface to configure the E2 node to invoke procedures related to Packet Data Convergence Protocol (PDCP) Duplication Control for a Data Radio Bearer (DRB), the control message including a DRB identity (ID), the control message to configure the E2 node to configure one or more user equipment (UEs) for one or more measurements, including Packet Loss Rate, for reporting to the E2 node;

receive reported measurements, including Packet Loss Rate per DRB per UE and per logical channel, from the E2 node over the E2 interface;

decode an action request message received from the E2 node, the action request message to request activation or deactivation of PDCP duplication for the DRB; and encode a response message for transmission to the E2 node in response to the action request message, the response message indicating whether the Near-RT RIC accepts or rejects the request for activation or deactivation of PDCP duplication for the DRB, wherein the activation or deactivation of PDCP duplication for the DRB is based on one or more RAN parameters for policy, and wherein the processing circuitry is to configure the Near-RT RIC to receive the Packet Loss Rate and receive the request for the PDCP duplication for reliability enhancement to achieve quality-of-service (QoS) targets, wherein the Packet Loss Rate is received from the E2 node for reported UE-level, cell level and network slice level measurements.

* * * * *